H. W. TUTTLE.
FILTERING MACHINE.
APPLICATION FILED SEPT. 28, 1917.

1,336,600. Patented Apr. 13, 1920.
5 SHEETS—SHEET 3.

Witness.
L. B. Graham

Inventor.
Henry W. Tuttle,
By Arthur L. Sprinkle
Att'y.

H. W. TUTTLE.
FILTERING MACHINE.
APPLICATION FILED SEPT. 28, 1917.
1,336,600.
Patented Apr. 13, 1920.
5 SHEETS—SHEET 4.
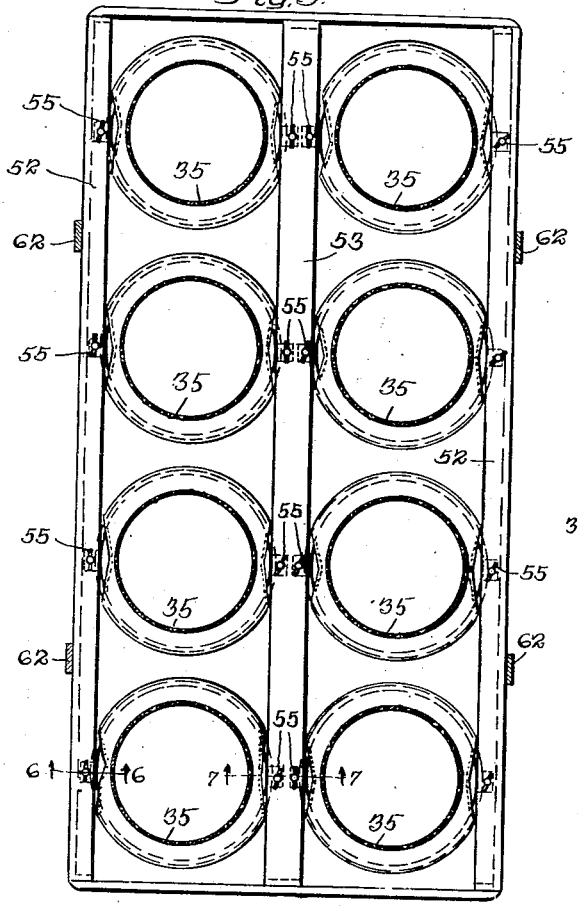
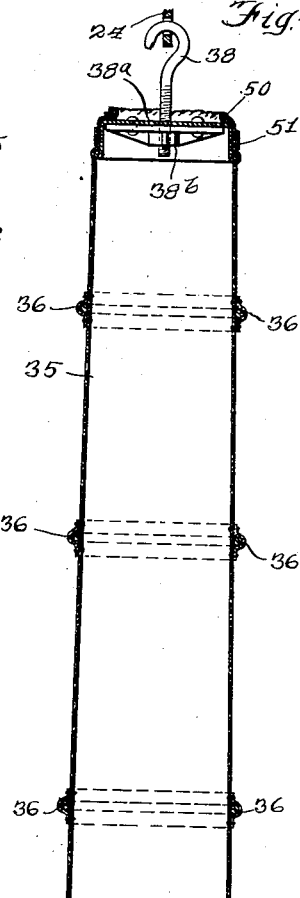
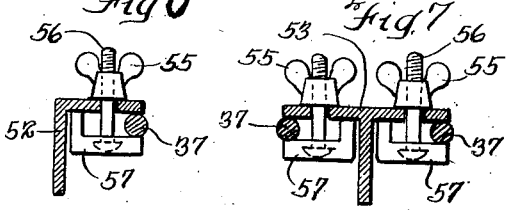
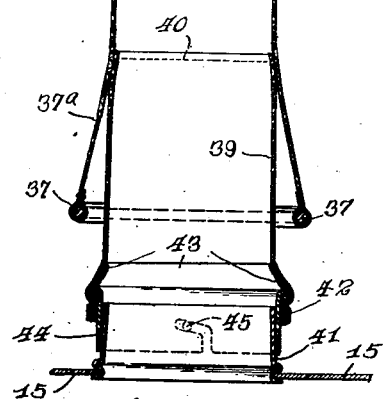

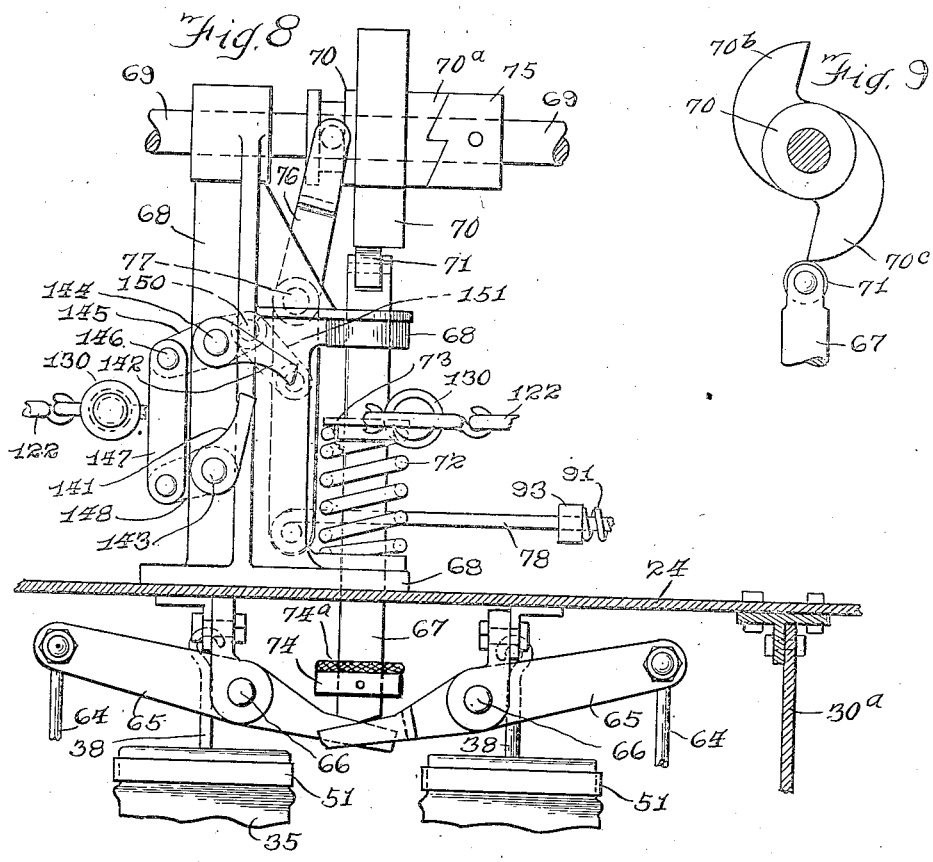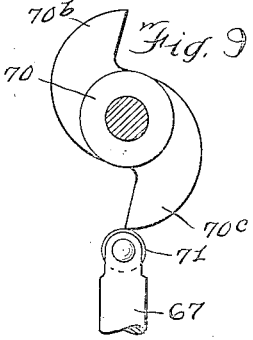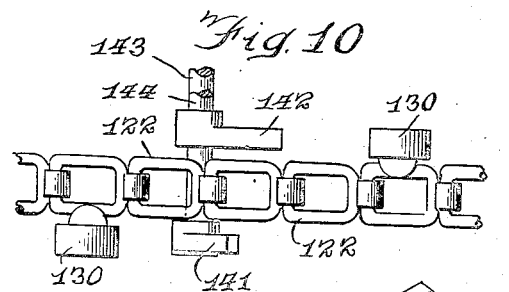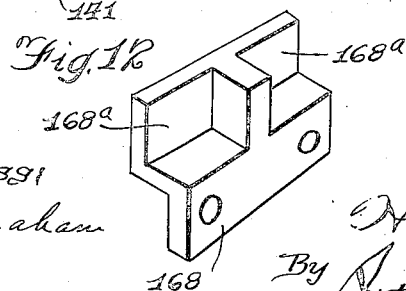

UNITED STATES PATENT OFFICE.

HENRY W. TUTTLE, OF DES PLAINES, ILLINOIS.

FILTERING-MACHINE.

1,336,600.  Specification of Letters Patent.  Patented Apr. 13, 1920.

Application filed September 28, 1917. Serial No. 193,703.

*To all whom it may concern:*

Be it known that I, HENRY W. TUTTLE, a citizen of the United States, residing at Des Plaines, in the county of Cook and State of Illinois, have invented certain new and useful Improvements in Filtering-Machines, of which the following is a specification.

The invention relates to filtering or dust collecting machines, and the primary object of the invention is to provide new and improved mechanism for collecting solid particles which may be floating in the atmosphere, such, for example, as collecting, removing or straining solids, in the form of dust or otherwise, from air or fumes. The mechanism is also adapted to recover various oxids from smelter fumes or gases, and may be used to remove particles of potash floating from cement or lime kilns.

It is a further object of the invention to provide a new and improved construction of filter unit, which may be multiplied indefinitely in any individual machine.

A further object of the invention is to provide new and improved mechanism for cleaning the filtering units.

A further object of the invention is the provision of a new and improved method of cleaning the filter units.

A further object of the invention is to provide new and improved mechanism for reversing the air current through the cleaning or straining devices.

A further object of the invention is to provide new and improved change gear mechanism, for changing the interval between cleaning the various groups of filter units, and also for varying the time of cleaning.

Still further objects of the invention will appear from the following specification, which is directed to a description of the preferred embodiment of the invention, shown in the accompanying drawings, the features of novelty finally being set forth in greater particularity in the subjoined claims.

Figure 1:
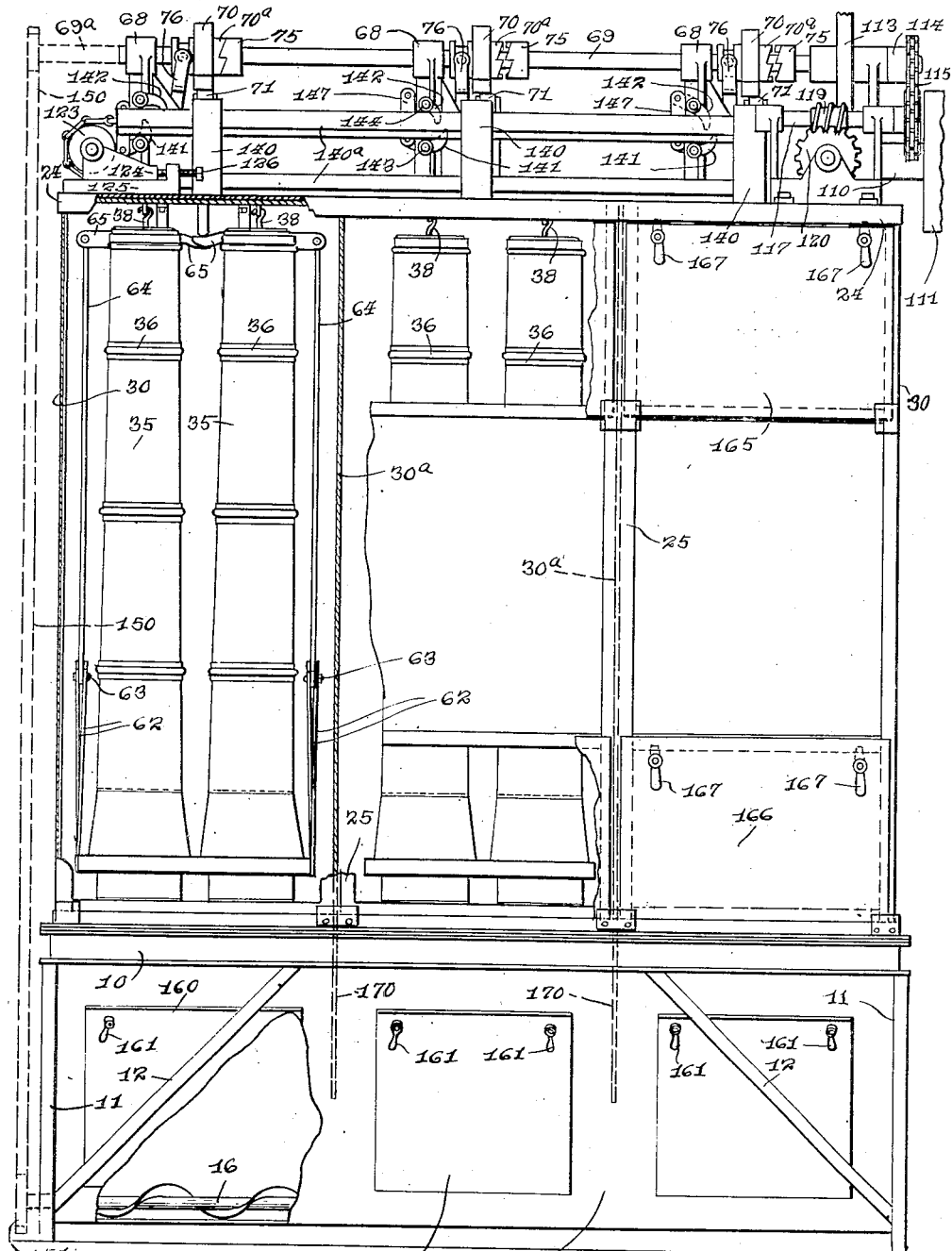
Figure 2:
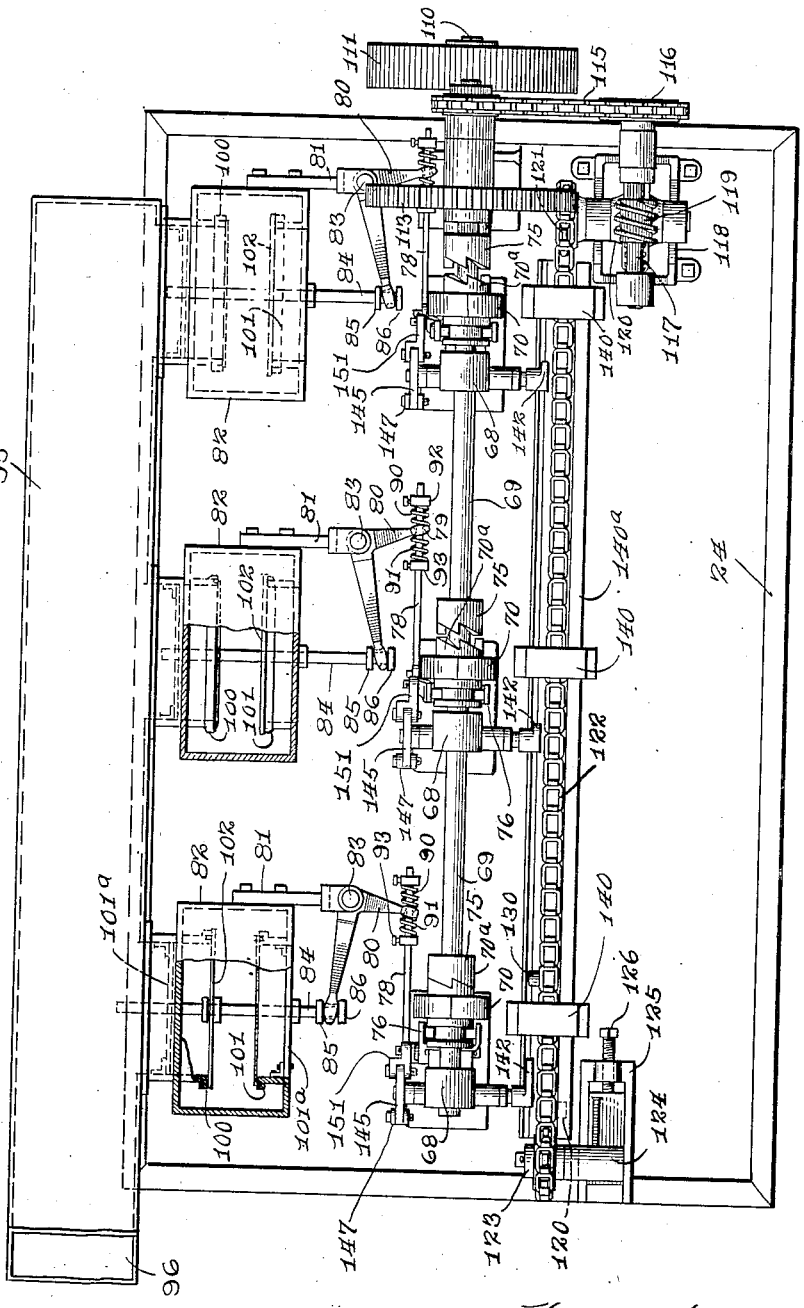
Figure 3:
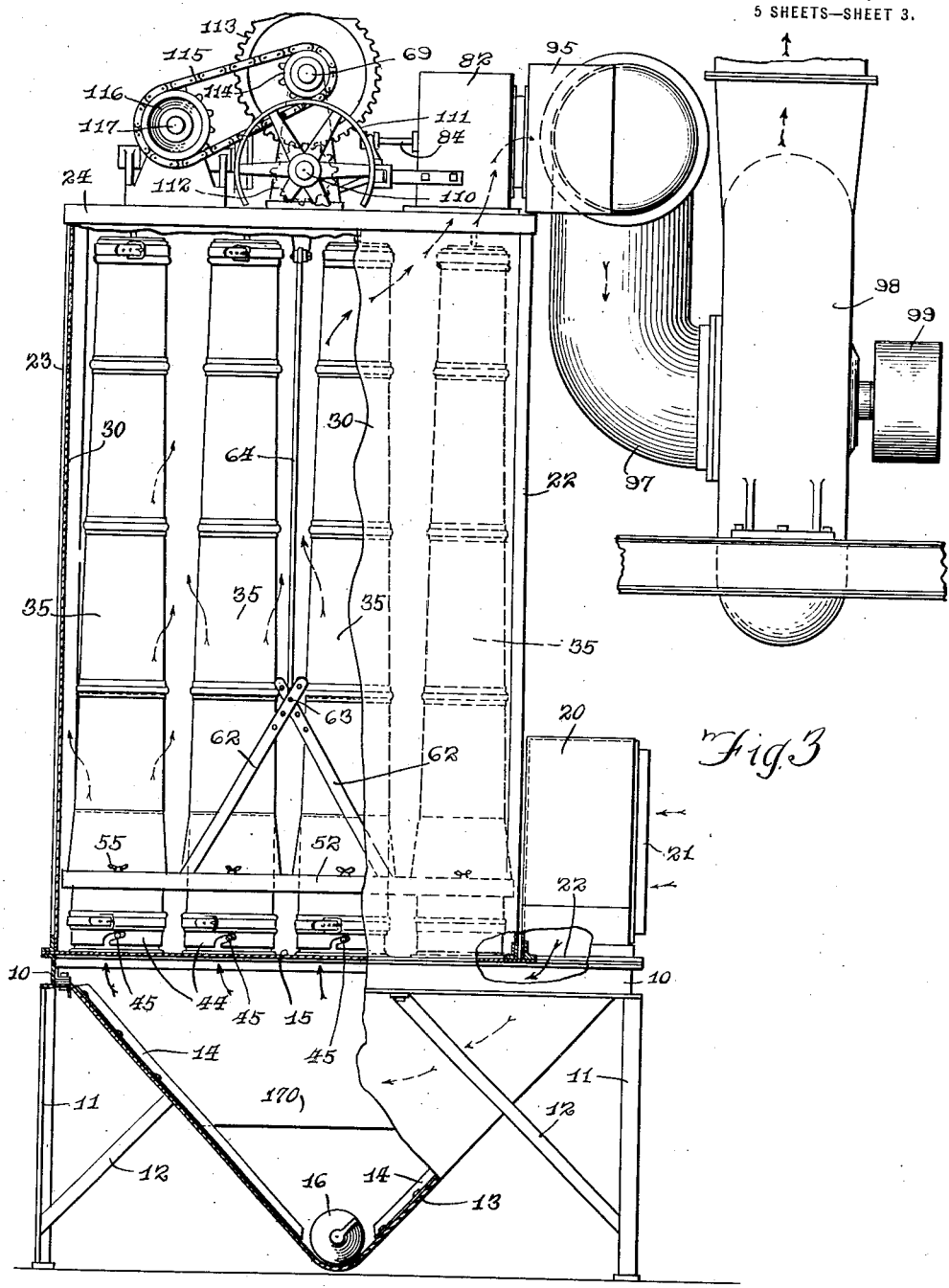

In the said drawings Figure 1 is a front elevation of a filtering machine embodying my invention, with certain parts of the casing or main frame of the machine broken away to disclose the interior construction. In Fig. 1 a portion of the main driving pulley is also broken away. Fig. 2 is a top plan view of the machine, with portions of the reverse valve casings broken away to disclose the interior valve construction. Fig. 3 is an end elevation of the machine, with a portion of the end wall of the casing broken away to disclose details of the interior construction of the machine. Fig. 4 is a sectional view showing the details of construction of one of the filter units or filtering tubes, and Fig. 5 is a top plan view of the agitating or shaker frame to which the filter units or tubes are attached, and by means of which they are shaken for cleansing. Figs. 6 and 7 are enlarged sectional views showing details of the manner of securement of the filter units or tubes to the shaker frame, being taken on lines 6—6 and 7—7 of Fig. 5. Fig. 8 is an enlarged detail of the mechanism for actuating the filtering units or tubes, with parts broken away. Figs. 9, 10 and 11 are enlarged details of portions of the mechanism of Fig. 8. Fig. 12 is an enlarged detail of the method of securing doors of machine to the casing.

The invention is shown incorporated in a main frame construction, which may consist of a rectangular channel iron frame, as indicated by the reference character 10 (see Figs. 1 and 3). The frame 10 is supported by four or more legs, designated by the reference character 11, which latter are braced from frame 10 by suitable diagonal braces 12. For the purpose of collecting the material gathered by the machine, the frame 10 supports a hopper or trough, preferably formed of sheet metal, as indicated by the reference character 13, which latter may be strengthened at intervals by suitable stiffening braces 14. The hopper 13 extends laterally from side to side of the machine, being substantially coextensive with the inside measurements of the frame 10, but tapering at the bottom, preferably in the form of a trough, as illustrated in Figs. 1 and 3, and being provided at the lowermost portion of the trough with a conveyer screw, by which filtered particles carried therein may be carried to an outlet or opening, to be taken from the machine. A suitable screw conveyer is shown in Figs. 1 and 3, and is designated by the reference character 16.

The upper portions of the machine above the frame 10 are divided from the hopper 13 by means of a metallic plate, which is substantially coextensive with the upper compartment of the machine containing the filtering units or tubes, and the mechanism for cleaning the same. This plate is designated by the reference character 15, and is provided with a plurality of openings, which are adapted to register with the lower extremities of the filter units or tubes. The function of the plate 15 is to separate the upper compartment, containing the filtering units or tubes, from the compartment below the frame 10, containing the dust-collecting trough 13. Communication between the upper or filtering chamber, containing the filtering units or tubes, and the dust-collecting trough below the perforated division plate 15, is possible only through the walls of the filter units or tubes, which will be presently described. From the construction of the device, as shown on Fig. 3, it will be seen that the upper compartment of the machine, containing the filtering units or tubes, while it is coextensive in length, as shown in Fig. 1, with the frame 10, from front to rear of this upper filtering compartment, it is not of the same depth as the lower frame, there being an offset portion at the rear extending over a portion of the hopper, opening on the interior of the frame 10 in the form of a dust-collecting header, which is designated generally by the reference character 20. The header 20 has an intake opening, indicated by the collar 21, to which a dust-collecting pipe of any desired construction may be attached, for bringing air, fumes, etc., to be filtered, to the machine. The opening between the header 20 and the interior of the hopper 13 is designated generally by the reference character 22 (Fig. 3). In Fig. 3 the wall of the header 20 is shown broken away, and the details of the manner of attaching the upper frame and the header 20 to the frame 10 are shown. The upper compartment of the machine containing the filtering units or tubes is formed preferably of structural metallic shapes, as indicated by the upright corner pieces 22 and 23, supporting on their upper extremities the top cover member 24. The top cover member 24 is further strengthened by spaced uprights, of which there may be any desired number, according to the number of groups of filter units desired to be incorporated into the machine. The intermediate uprights referred to are designated by the reference character 25 (Fig. 1).

In the embodiment of the invention illustrated in the drawings, the machine is of a size comprising three groups of filter units or tubes. This is a matter wholly discretionary with the designer, as the number of groups of filter units will be dependent entirely upon the amount and character of the filtering work to be done in any individual case. In like manner, the total length of the machine will be dependent upon the number of groups of filter units employed, and in the present embodiment the three groups have been shown merely for convenience of illustration and description. Obviously, the upper compartment, containing the filtering units, will be rendered dust-tight by suitable side-inclosing walls of sheet metal, as indicated by the reference character 30, and plates 30ª divide the compartment for the separate groups of filter units.

The filter units or tubes.

The filter units or tubes are shown in the detailed sectional view Fig. 4, and also in side elevation in Figs. 1 and 3. They consist substantially of tubular or cylindrical-shaped cloth tubes, the main tubular portion being formed of any grade of cloth adaptable for the filtration or separation in the particular work in hand. The filtration of some materials requires a fine grade of wool cloth; in other conditions, cotton cloth, or other grades of flexible material, may be employed.

In Fig. 4 I show a filter unit in section, the tubular portion of which is designated the reference character 35, the latter being reinforced at intervals, as indicated at 36, by rings of reed or fiber material. The object of these rings is to prevent collapsing of the tubular cloth upon reversal of the current, which operation will hereinafter be described. The rings 36 are preferably of reed or some light non-metallic material, so as to avoid weight in so far as possible, and they are shown in the drawings as secured to the outer walls of the tubular member 35 by a band of material stitched on each side of the ring to the outer wall of the filter tube. The lower extremity of the filter tube 35 has secured thereto a circumferential ring of some heavy material, such as metal. It is essential that this ring, which is designated in Fig. 4 by the reference character 37, have considerable weight, strength and rigidity, in order to exercise a jerking action upon the lower extremity of the filter tube, in the manner hereinafter described. Preferably, the tube 35 is attached to a suitable supporting closure member at its upper extremity, the closure member having a hook 38, or other device for attachment or suspension, and also for adjustment of the tube to the upper end of the filtering casing. The filter tube extends to the bottom of the filter casing, and is connected to the plate 15, separating the filter casing from the dust collecting hopper in the casing beneath. The division plate 15 will be provided with as many openings as it is desired to employ units of the filter tubes. The preferred construction at the lower extremity of the filter tubes is that illustrated in Fig. 4, in which the fabric of the tube 35 terminates at the metallic ring 37, with a supplemental tubular member of the same material, as designated by the reference character 39, stitched to the tubular member 35, as indicated at 40, this point of securement being preferably some distance above the metallic ring 37, to enable the ring 37 to hang loosely upon a considerable length of the free tubular portion 37ᵃ for purposes to be hereinafter more fully set forth.

The openings in the bottom division or plate 15 of the filter chamber are provided with suitable thimbles or collars, extending upwardly into the filter chamber, as indicated by the reference character 41, and the lower extremities of the tubular portions 39 are formed with suitable devices for attachment to the thimbles or collars 41. One of such straps and buckles, or other suitable devices as may be attached, is shown and designated in Fig. 4 by the reference character 42. At 43 I show a reinforcing strip of a suitable material, adapted to withstand heat, and also wear, to serve as a strengthening medium to the portions of the tubular members 35 and 39 wherever they come in contact with the metallic portions of the device. The lower extremity of the tubular member 39 is shown attached to the metallic ring 44, which latter registers upon the exterior of the collar 41, and may be detachably secured thereon by the bayonet joint and the pin, as indicated by the reference character 45.

Reference has been made to the hook 38, for the attachment of the filter tube to the upper extremity of the filter casing, designated generally by the reference character 24. This hook 38 is preferably threaded as indicated in Fig. 4, and this construction enables it to be adjustably attached to the plate 38ᵃ, which is perforated and receives the shank of the hook 38, which is screw-threaded and has nut 38ᵇ on the lower extremity thereof. The plate 38ᵃ has a depending circular flange, as indicated in Fig. 4, and the upper extremity of the filter tube 35 is attached by means of a suitable puckering string, as indicated at 50, and the securement of the parts together is further strengthened by means of a strap, as indicated at 51.

*Tube cleaning mechanism.*

In Fig. 5 is shown details of construction of a vibrating frame adapted to be secured to each of the metallic rings 37, on the petticoated lower extremity of the filter tubes 35. This frame is designated generally by the reference character 52, and consists of rectangular side and end pieces and a strip extending lengthwise of the frame, midway between the longitudinal side edges of the frame designated by the reference character 53. The detail of the central member 53 is shown in the sectional view Fig. 7. In Fig. 6 is shown a detailed sectional view of one of the outer members of the frame 52, from which it will be seen that the metallic rings 37 of the filter tubes may each be clamped between the side and central strips of the shaker frame. The manner of the clamping of the rings 37 to this frame is by means of suitable winged nuts 55, coöperating with the threaded bolts 56, having suitable binding lugs 57 connected thereto, which latter are adapted to clamp and bind the rings 37 upon the frame members 52 and 53, so that any movements imparted to the shaker frame 52 will be imparted to the rings 37 connected with the filter tubes.

The frame 52 is suspended within the filter casing adjacent to the lower extremities of the filter units or tubes, and its function is to impart vibrations to the filter tubes to clean them of all collections or accumulations of material filtered from the air passing through the machine. It will be understood that one of the vibrating frames 52 is located in each of the filter unit chambers, and independent suspending and vibrating mechanism for each of these frames is provided. The details of the suspending and vibrating mechanism for these frames may be seen from an inspection of Figs. 1, 2, 3 and 8. Each of the frames 52 has secured to it four straps, designated by the reference character 62, there being two of these straps on each side of the frames, spaced apart suitable distances to balance the frame, and being brought together at their upper extremities in pairs, at opposite sides of the frames, where they are connected at 63 to a pair of suspending and operating rods 64, one on either side of the frame. The rods 64 articulate with the free ends of the levers 65, pivoted at 66 to suitable brackets on the upper top member 24 of the filter casing. The free ends of the levers 65 are arranged adjacent to each other, so that they may be acted upon by a common plunger 67, which protrudes through an opening in the upper top plate 24 of the filter casing, and is mounted to reciprocate in suitable plunger bracket 68, positioned on the top of the upper end of the filter casing. The bracket 68 is of sufficiently sturdy construction to support a main operating shaft, designated by the reference character 69. It is preferred that there shall be as many of the brackets 68, for supporting the shaft 69, as there are compartments in the filter casing. The shaft 69 is provided with a plurality of shiftable cams 70, adapted, when in operative position on the shaft 69, to coöperate with suitable anti-friction rollers 71, in the upper extremities of the plunger members 67. The plungers 67 are held in their upright or retracted positions by means of suitable coil springs 72 surrounding the same, and interposed between fixed collars 73 thereon and the bottom of the supporting bracket 68. The lower extremity of the plunger 67, beneath the plate 24, is provided with a collar 74, pinned or rigidly fastened to the plunger 67, and having on the upper side thereof a buffer 74ª of suitable flexible material, such as rubber or leather, adapted to ease the jar or shock of the return of the plunger, under the influence of the compression spring 72, upon the release of the plunger by the action of the cams 70.

It will be apparent from the above description that the rotation of cams 70 will impart downward motion to plunger 67, which in turn will act upon levers 65 and, through the suspension rods 64, cause the vibration of the frame 52.

Cams 70 are slidably mounted on shaft 69, and are provided with one-half of a 2-part clutch, as indicated at 70ª; the other part of the clutch, designated by the reference character 75, is rigidly attached to shaft 69. Cams 70 are actuated by a shipper lever 76, pivotally mounted on bracket 68, at 77. The lower extremity of the shipper lever is connected with a pitman 78, in turn articulated at 79 with one of the ends of the bell crank lever 80, which latter is pivoted to bracket 81, supported on one side of the valve casing 82, the latter being supported on top of the upper plate 24. This pivotal connection of the bell crank lever 80 is designated at 83, and the free end of the bell crank 80 is provided with an eye passing over the one end of the valve stem 84, between fixed collars 85 and 86 thereon. In like manner, the other perforated free end of the bell crank 80 passes over the pitman 78, and is secured thereon between coil springs 90, 91, which are held in position by the adjustable collars 92, 93, on each of the rods 78.

Obviously, there will be as many groups of shaker mechanism for the filter tube compartments as there are compartments in the machine. In the present embodiment I have shown three of these compartments, and likewise there will be three of the valve casings 82 connecting with a common discharge header, designated generally by the reference character 95, and having an outlet at 96 (see Fig. 2), where this header is connected with an exhaust pipe 97, leading to an exhaust fan, the casing of which is designated generally by the reference character 98. The fan 98 is preferably power-operated and of any desired construction to exhaust the atmosphere, in the direction indicated by the arrows, through the fan casing and through the exhaust header 96 and connecting pipe 97. Pulley 99, for operating the fan, is shown in Fig. 3.

In the particular embodiment of the invention, the machine is adapted to filter the air that may be taken through the intake 20, for example, from the interior of a building or factory. Obviously, any suitable connections may be attached to header 20 and flange 21 thereon. When exhaust fan 98 is operated, the air will be exhausted from the common header 95, and the atmospheric pressure will tend to force any air or fumes that may be in the intake header 20, or the connections adjacent thereto, through the machine, in the following manner, for the purpose of filtering it: The pressure of the atmosphere on the exterior of the machine, or through the connections leading to header 20, will pass downwardly through the opening 22 into the compartment bounded by the hopper 13, on the underside, and by the perforated plate 15, on the upper side, and the draft or flow of air, or other fluid or gases to be filtered in the direction indicated will, of course, be augmented in proportion to the exhausting effect of the fan 98 from the interior of the machine. When the fan is operating in a normal manner there will be a sufficient pull, due to the vacuum created on the interior in the upper compartments, to cause the flow of the fluid, gas or air, not only into the compartment below, bounded by the hopper and the division plate, where particles of considerable size may be deposited in the hopper, but the flow of the fluid or gas will continue upwardly, through openings in the plate 15, into such of the compartment units as may be operatively connected with the exhaust header 95. Obviously, any fluid or gas entering the perforations in the plate 15, and passing upwardly into the filter tubes 35, can only escape from the tube by passing through the pores of the cloth walls of the tube. It is here that the effective filtering action on the air or gas or other fluid takes place, the filtered particles either accumulating or wedging into the pores and interstices of the filter cloth 35, or else dropping downwardly into the hopper 13, to be removed therefrom by the screw 16. The current flowing through the machine, passing in this manner through the pores or interstices in the cloth walls of the filter tubes, after passing into the compartments surrounding the tubes, and in this manner having any solid particles strained or removed therefrom, will pass next upwardly into the valve casing 82, connecting with its respective filter compartment.

The valve casings 82 are each provided with two valve seats, which are designated by the reference characters 100 and 101. The valve seat 100 surrounds an opening communicating with header 95, and the valve seat 101 surrounds an opening leading to atmosphere, while interior of casing is in communication with the interior of a filter compartment containing the filter tubes described. Mention has already been made of the reciprocating valve stem 84 passing through suitable guide 101ᵃ attached adjacent to the valve seats to the walls of each of the valve casings 82. Each of these valve stems 84 carries a valve adapted to be reciprocated from the valve seat 100 to the valve seat 101, under the control of the bell crank, a pitman connection (heretofore described) for operating the valve stems 84. This valve is designated in the drawings by the reference character 102, and may be in the form of a circular metallic plate, adapted to fit closely and close the openings adjacent to the valve seats 100 and 101, which latter are preferably felt-lined. The valve casings 82, and the mechanisms connected therewith, are made necessary by the fact that, in a filter of the character described, if the operation of the air or gases to be filtered is carried on continuously through the filter tubes, they will eventually become clogged with the accumulation of solid matter passing through the perforations in their walls. It is therefore necessary, at intervals, to clean the tubes. This is accomplished by shaking or jerking the tubes, near their lower extremities, by positively actuating the shaker frames 52, which act at intervals to violently jerk the rings 37 of any designated frame at certain intervals.

I have also discovered that the operation of cleaning the filter tubes is greatly expedited if, a little before the instant of cleaning or jerking of the tubes, for the purpose of cleaning, there be a complete reversal of the current passing through the tubes, such current reversal to continue until after the agitation of tubes ceases. In a machine having only a single filtering compartment, if the current is to be reversed at the instant of cleaning, obviously no filtering will take place during the reversal of the current through the machine. However, in the present improved arrangement of my machine, the different filtering compartments are so arranged and connected with the inlet and outlet manifolds that at all times the general direction of the current through the machine will be such as to permit part of the filter compartments to be in operation, while at certain intervals each of the compartments, with its frame of filter tubes and its actuating mechanism, will be automatically so acted upon in the cycle of operation of the machine as to cause the filtering operation therethrough to be temporarily suspended by the complete reversal of the current through the designated filtering compartments, which will insure a thorough cleaning of the filtered solids from the tubes, and cause same to be dislodged therefrom and deposited in the collecting hopper 13 at the bottom of the machine, having passed downwardly therein through the perforations in plate 15, at the lower extremities of the filter tubes.

The machine having been set in operation by operating the exhaust fan, there will be a current passing through the machine, in the manner described, in every case where the position of the valves in valve casings 82 will permit. In order to more clearly describe the operation of the tube cleaning mechanism, two of the units associated with the valve casings 82, of Fig. 2, are shown in normal position, so that the mechanism is inoperative to clean the tubes while the valves 102 therein are shown in position on seats 101, both of which lead to the atmosphere, while, with respect to the valve casing at the extreme left (Fig. 2), the valve therein is shown in a shifted position, opening the interior of casing to atmosphere and closing the port leading to the header 95 and the suction fan 98. It is this movement of the valve 102 that cuts off the suction through the associated compartment in the normal filtering direction, while the atmospheric pressure, passing through the port, 101, into the interior of the associated compartment, causes a reversal of the current through the walls of the filter tubes in the particular compartment, so that the current, instead of passing upwardly into the interior of the tubes, from the bottom and thence upwardly into the compartment, will pass from the exterior through the walls of the tube and thence downwardly on the interior of the tube and through the opening in plate 15 into the solids collecting compartment below.

It is one of the important features of my invention that I so arrange the control valves 102 in valve casings 82 that they are operated to cause a reversal of the current from the filtering tubes, in a designated compartment, whenever the cleaning frame 52 in that compartment is being reciprocated for the purpose of jerking the tubes through the reciprocation of the rings 37, for the purpose of dislodging particles therefrom, and causing same to fall down on the interior of the tube into the solids and dust-collecting compartment below.

Shaft 69, which operates the controlling valves and also the shaker mechanism, may be operated in any desired manner to give a continuous rotation. A desirable construction, I have found, is to use a countershaft 110, journaled on suitable supporting bracket on the top frame 24. This countershaft carries the driving pulley 111 and also a gear 112, meshing with gear 113, keyed to rotate with the driving shaft 69. The driving shaft 69, at one extremity, carries a sprocket gear 114 and a chain 115 in engagement with a suitable sprocket 116 on a countershaft 117, journaled on a bracket also supported by the top plate 24.

The countershaft 117, which will be constantly rotated from the driving shaft 69, is designed for the purpose of operating the tube-tripping mechanism for throwing the tube-cleaning or shaking mechanism into and out of operation from the main drive shaft 69, at designated intervals.

The bracket 118 with the countershaft 117 is also arranged to carry a gear 120, meshing with the worm 119 on countershaft 117. The gear 120 operates a sprocket wheel 121, which carries a sprocket chain 122, extending longitudinally over the top frame 24, preferably parallel with the drive shaft 69, the other end of this chain being carried on idler sprocket 123, mounted in the bracket 124. In order to properly tension the chain 122, the bracket 124, carrying the sprocket, is adjustably or slidably mounted in a supporting frame 125, being controlled in relation thereto by screw 126.

The foregoing description of the shaker cams 70, and the clutch mechanism for operating same from drive shaft 69, has made it apparent that, whenever the two-part clutch members 70ª and 75 are in engagement, the reciprocation of the plunger 67, coöperating with that cam, will vibrate the tube-shaker-frames in the coöperating filter compartment. The shifting of the shaker operating cams, which shift also in the manner described, will operate the control valves of casings 82, and is accomplished in the following manner: The constantly rotating sprocket chain 122 carries a plurality of spaced lugs or anti-friction rollers on each side thereof. These are designated by the reference character 130. (See Figs. 2, 8 and 11). The lugs or rollers 130 on one side of the chain are designed to engage the clutch and valve-operating mechanism in such a manner as to shift the clutch parts to engaging position, where they will remain in that position, with the particular compartment affected opening through valve casing 82 to the atmosphere, while positive reciprocatory movement will be applied to the shaker frame 52, within the designated compartment, for the purpose of shaking and cleaning the tubes, during at least a part of the time that there is a reversal of the current through the designated compartment and the tubes therein. Adjacent to each of the brackets 68 which support on the upper plate 24 the clutch mechanism, and the connections operated therewith for imparting movement to the tube-shaker mechanism and to the valves in casings 82, there are other brackets adapted to support a guide for chain 122. These brackets are designated by the reference character 140, and the metallic chain guide, itself designated by reference character 140ª. One hundred and forty-one (141) and 142 are trip fingers, mounted on each of the brackets 68, and these fingers are respectively positioned on opposite sides of and adjacent to the sprocket chain 122, so that the roller projections 130 on the chain will contact with the respective trip finger on its side of the chain. Trip fingers 141 and 142 are secured to shafts 143 and 144, respectively, these being mounted on brackets 68. The shaft 144 carries a lever 145, one end of which is articulated at 146 with the link 147, the latter being pivotally connected with an arm 148 on shaft 143, which carries the companion trip finger 141. The lever 145 is elongated in both directions from the shaft 144, and the other end, opposite the connection 146, is articulated at 150 to the link 151, which latter is pivotally connected with the cam and clutch shipper lever 76, heretofore referred to.

In the operation of the machine the chain 122, being constantly in motion, will bring the rollers or lugs 130 into contact with the trip fingers 141, 142, and it will be apparent that when one of the rollers 130 engages the trip finger 141 the link 147 will be lifted, and the shaft 144, carrying the link 145, will be rotated in a clockwise direction, which will result in shifting the link 151 so as to cause the shipper lever 76 to slide the cams 70 to the left, disengaging the two-part clutch 70ª and 75. This same movement of the trip finger 141 will obviously, by reason of the clockwise movement of the shaft 144, result in causing the trip finger 142 to assume an almost vertical position, causing it to lie within the path of one of the roller lugs on the opposite side of the chain 122, and in position so that when one of those lugs passes the trip finger 142 it will engage and shift it in a counter-clockwise direction, which will have the effect of shipping the clutch and cam in the opposite or to its closed position, so that the teeth of the two-part clutch 70ª and 75 will be in engagement. It is this latter shift of the trip finger and the clutch that puts the mechanism in position so that the two operative portions, 70ᵇ and 70ᶜ, of the cam will act upon the plunger 67, to operate the shaker rods and frames for the purpose of cleaning. The same shift of the lever 76, acting upon the rod 78 (already described), will reciprocate this lever toward the left, rotating the bell crank 80 is a clockwise direction and shifting the valve stem 84 in valve casing 82 to a position where the valve inlet leading to header 95, from the casing 82, is closed. At the same time, the valve 102, however, shifts, which obviously opens the casing 82 to the atmosphere by uncovering the valve seat 101. These last positions of the parts, with the clutch in engagement for the purpose of reversing the current, and operating the shaker frame, for the purpose of cleaning the filter tubes 35, are represented by the positions of the parts of the filter unit at the extreme lefthand end of the device shown in Fig. 2, and is also illustrated by the position of the same parts in Fig. 8, where the shaker mechanism is shown in operation with the plunger 67 operating the shaker frame. The use of the sprocket chain 122, carrying the operating roller lugs 130, is preferred, because these chains are made of a plurality of detachable links, and any desired timing, either as to the length between intervals for shaking or length of any shaking or cleaning period, can be regulated according to the desires of the operator or owner of the machine, dependent of course upon the character of the work to be done. When a unit, such as the unit at the extreme lefthand end of Fig. 2, has its clutch mechanism in operation, so that the interior of the filter cavity is open to the atmosphere through valve seat 101, and the shaker frames are being agitated or reciprocated by the rods 64, it is desired that the other units of the machine shall have the clutch and operating cam mechanism disengaged. In other words, it is desired to have the shaker and current mechanism operative on only one unit at a time and, under some conditions, then it is only necessary to operate one unit at a time, for comparatively brief intervals, in order to make the cleaning operations effective.

With the above description of the cleaner-agitating devices, and the described manner of operating the valve 102 within the casings 82, it will now be apparent why the operation of valve 102 results in a reversal of the current through the designated compartment undergoing the cleaning operation, for it will be seen that, in the normal positions of the valve 102, as indicated by the position of the valve in the two casings 82, at the right of Fig. 2, the port controlled by valve seat 101 is closed, and the vacuum produced by the exhaust fan will cause the outside atmosphere to press through the intake manifold 20 and the hopper compartment below plate 15, thence rising through the perforations and from the interior of the tubes 35 to the exterior thereof and outwardly through header 95. When, however, the valve 102 shifts so as to close upon the valve seat and opening leading to the header 95, the operation having opened the valve port and seat 101 to the atmosphere, it will be seen that whatever vacuum or rarefaction of the air may be in the hopper compartment below the plate 15, due to the action of the exhaust fan, will cause a reversal of current in that compartment in which the valve port 101, in casing 82, is opened to the atmosphere, and the air will rush in through casing 82, thence into the corresponding compartment, through the walls of the filter tubes to the interior thereof, and thence downwardly into the vacuum below the plate 15, completely reversing the current through the fabric walls of the filter tubes, at the same time that their lower ends are being violently agitated or reciprocated by reason of the vertical rising and falling of the frame 52, thus giving the filter tubes a whipping motion that I find very effective in dislodging any solid particles that may be adhering to the interior of the filter tubes, and causing same to drop downwardly or be carried downwardly by the rushing current of air into hopper 13 below.

In Fig. 1 I show a means for operating the screw 16, in the bottom of the hopper, which may be accomplished by the extension of the shaft 69, at the top of the view in Fig. 1, as indicated at 69$^a$, placing a suitable pulley or sprocket thereon, and using a flexible chain or belt, as indicated at 150, and passing same over a pulley or sprocket 151 on the end of the screw 16.

In Fig. 1 I show the angular walls of the hopper 13 provided with openings, having closure members 160. These members are in the form of detachable plates, and may be secured in position over their respective openings by suitable latches,, the outer portions of which are represented by the reference character 161. Other parts of the side walls of the filter compartments may be provided with detachable and removable door sections, as indicated at 165 and 166 (Fig. 1), latches 167 being provided to secure the detachable doors at their top edges, while at the bottoms they are secured in position, forming, in effect, a continuous part of the compartment wall, by suitable binding pieces, as indicated by the reference character 168, shown in detail in Fig. 12. These parts may be secured to the walls of the cleaning compartments by bolts or rivets passing through the indicated holes, the parts having the offsets (as indicated at 168$^a$) for the reception of the lower portions of the detachable doors.

I find it is desirable to prevent, as far as possible, the commingling of the materials passing downwardly through any compartment in which cleaning is taking place with any other of the compartments of the machine which are normally operating with the ascending currents. In order to prevent such commingling of reverse and direct currents through adjacent compartments, and to expedite the precipitation of heavier than air or gas particles within the lower compartment or hopper, I prefer to provide baffle plates, extending laterally across the hopper 13, being in the form of continuous metallic plates, adjoining at their top edges so as to form a closure with the division plate 15, and extending from side to side of the lower or hopper compartment, terminating some distance above the bottom and trough-shaped portion of the hopper, in order to leave ample room for the accommodation of the screw conveyer 16. These baffle plates are shown in Figs. 1 and 3, and are designated by the reference character 170.

Reference has been made to the preferred form of the drive for operating the shaker and current reversal mechanisms, and it will be seen that the sprocket chain 122, being formed of detachable links, may have the anti-friction rollers 130 arranged therein at whatever intervals may be desired, thereby increasing or decreasing the time or duration of the cleaning period, according to the desire of the operator and the conditions in hand.

Under some conditions it is desirable to change the mechanism operating the shaker and current reversal mechanisms, in order to change the interval of time between the successive shaking and cleaning operations. This can be accomplished by changing the speed of travel of the sprocket chain 122, and while this may be accomplished in several ways, without changing the speed of the constantly driving shaft 69, I prefer to provide whatever variation may be found desirable in the speed of travel of shaft 117 and the chain controlled thereby from the shaft 69 by the substitution of different sized sprockets, in place of the sprockets 114 and 116, respectively, using of course a sprocket chain of suitable length to operate with whatever sized sprockets may be chosen to secure the desired speed of the shaker and current mechanisms.

While I have above illustrated and described the preferred form of my invention, it is not desired to be limited to the precise details set forth, for it will be apparent that persons skilled in the art may resort to various modifications of the details set forth without departing from the invention.

I claim:—

1. A filtering machine comprising a filtering chamber, a plurality of filtering devices in said chamber, there being inlet and outlet openings in said chamber to permit the passage of fluids or gases through said chamber, said filtering devices being connected to the inlet openings of the chamber so that fluids or gases passing into the chamber must pass into the filtering devices, means for agitating synchronously all of the filtering devices in said chamber, and means for moving a reverse current of pure air through said chamber and said filtering devices while said filtering devices are being agitated for the purpose of cleaning the filtering devices.

2. A filtering machine comprising a plurality of filtering chambers, filtering devices in each of said chambers, means for exhausting the air or gases on the interior of said filtering chambers, means for synchronously agitating the filtering devices successively with respect to each of said chambers, and means for reversing the current in each of the said chambers and filtering devices when the filtering devices in that chamber are being synchronously agitated for the purpose of cleaning them.

3. A filtering machine comprising a filtering chamber, a plurality of filtering devices in said chamber, comprising tubular members of flexible, porous material suspended from the upper extremities thereof, the tubular members being formed from near the extremities to the bottom thereof, of an integral strip or strips of woven fabric with respect to their longitudinal extension, and having near their lower-most extremities an enlarged or petticoated portion, a metallic ring secured to the bottom of the enlarged or petticoated portion, a tubular extension of the filter device secured to the tubular portion thereof adjacent the top of the petticoated or enlarged portion, means for securing the tubular extension to the bottom of the filter chamber adjacent an opening therein, a frame adapted to be attached to the metallic ring of the enlarged or petticoated portion, and means for imparting vibration to the frame to agitate the walls of the tubular filter member in cleaning.

4. A filtering machine having a filtering chamber, a filtering device in said chamber comprising a tubular member of cloth or other porous, flexible filtering material, the said tubular member being closed at its upper extremity and open at its lower extremity and suspended from its upper extremity within the said chamber, there being an opening in the bottom of the chamber adjacent the opening in the lower extremity of the tubular member and communicating therewith, a petticoated extension on the exterior of the tubular filter member between the extremities thereof, a frame secured to the exterior petticoated portion, and means for vibrating the frame for cleaning the filter member.

5. A filtering machine comprising a filtering chamber, a plurality of filtering devices in said chamber comprising tubular members of porous fabric suspended at their upper extremities, the material of the said tubular members extending integrally from the top thereof down to and including an enlarged or petticoated portion provided with a metallic ring, a tubular extension attached to the filter device adjacent the petticoated portions and forming an extension of the main tubular part of each of the said filtering devices, a cleaning frame vibratively mounted within the filtering chamber, and means for securing the petticoated or enlarged portions of the filter device to the said frame.

6. A filtering machine comprising a filtering chamber, a plurality of filtering devices in said chamber, valve mechanism for controlling the current through said chamber and filtering devices, a sprocket chain, means carried by the sprocket chain adapted to set the mechanism in motion for cleaning the filtering devices and at the same time to operate the said valve mechanism for controlling the direction of current through filtering chamber.

7. A filtering machine comprising a plurality of filtering chambers, filtering devices in said chambers comprising cylindrical woven tubes, means for independently vibrating the cleaning devices in each of said chambers, independent valve mechanism for controlling the circulation and direction of current through each of said filtering chambers, and a device associated with each of said filtering chambers for intermittently vibrating said filtering devices and for shifting said controlling valves at the beginning and at the end of each vibrating period.

8. A filtering machine comprising a filtering device, means for controlling the direction of current through the filtering device, means for operating the filtering device during intermittent cleaning periods comprising a sprocket chain having a plurality of detachable links some of which carry tripping devices adapted to engage mechanism to set the filtering device in operation, the links of the said chain being detachable whereby to vary the position of the tripping devices in the said chain for varying the length of the cleaning period.

9. A filtering machine comprising a plurality of filter chambers, filtering devices in each of said chambers, valves for controlling the direction of current through said filter chambers, and said filtering devices, a constantly operated device, a plurality of intermittently operated devices, one for operating each of said valve mechanisms, and means actuated by said constantly operated device for engaging or disengaging said intermittently operated valve operating devices with said constantly operated device.

10. A filtering machine comprising a filtering chamber divided into a plurality of spaced compartments, a filtering device in each of said compartments of the chamber comprising tubular members of cloth or other porous flexible fabric suspended in the compartments near their upper extremities, vibratable frames in each of the said compartments of the filtering chamber, means for introducing currents of dust laden air into the lower extremities of the said filtering device within each of the compartments of the said filtering chamber, means for producing a vacuum within each of the compartments of the filtering chamber whereby to move the air currents from the interior to the exterior of the filtering device, and means for introducing a current of pure air in the reverse direction through one of the closed compartments of the filtering chamber and for agitating the frames controlling the filtering device therein while the filtering devices of the remaining compartments of the chamber remain in a quiet condition and receive currents of the dust laden air passing therethrough in the normal direction for filtering.

11. In a filtering machine a constantly operated driving shaft, a two-part clutch, one member of said clutch being fixed to said driving shaft, and the other member of the clutch being slidably mounted thereon and being adapted to engage the fixed member of the clutch, a cam operated by the movable member of said clutch, a filtering chamber, a filtering device in said chamber, means for agitating said filtering device from said cam for the purpose of cleaning the filtering device, valve mechanism for controlling the direction of the current through said filtering chamber, a constantly operated device operated by said drive shaft, and connections between said last mentioned device and said slidable clutch member and said valve controlling device whereby both the filtering and cleaning device and the current controlling valve mechanism may be operated simultaneously from the said constantly operated device.

12. In a filtering machine a main driving shaft, filtering devices, means actuating the filtering devices, for cleaning same comprising a slidable clutch adapted to be operated by the main driving shaft, valve mechanism adapted to control the direction of current through the filtering devices, a lever, operatively connected with said clutch and also having operative connections with said valve mechanism for controlling same, a constantly operated device actuated by the said driving shaft, and means interposed between the said constantly operated device and said lever for synchronously operating said clutch and said valve controlling devices, said means being adapted to positively lock the said lever with the said clutch in its open position and to lock the valve mechanism in position to permit the normal operation of the filtering device.

13. In a filtering machine the combination with a filtering chamber, a filtering device in said chamber, a discharge header, a valve casing interposed between said filtering chamber and said discharge header, there being openings in said valve casing communicating between said casing and said discharge header, between said casing and said filter member, and between said casing and the atmosphere, opposed valve seats adjacent the openings leading from said valve casing to said discharge header, and to the atmosphere, each of said valve seats being substantially circular in form, a reciprocating valve stem adjacent the said valve seats and extending therebetween, a substantially circular metallic valve disk loosely carried by said valve stem between fixed collars thereon and being adapted to alternately close said valve seats and means for actuating said valve stem.

14. A filtering machine comprising a plurality of filtering chambers, filtering devices in said chambers, a constantly operated driving shaft, means for actuating the filtering devices in said chambers, valve mechanism for controlling the direction of current through said filtering devices, means for actuating said valve controlling mechanism and said filtering devices from the driving shaft, constantly operated means for throwing said filtering devices and said valve controlling mechanism into and out of said operative relation with the driving shaft, and means for varying the speed by which the said constantly operated means is driven from the drive shaft.

15. A filtering machine comprising a plurality of filtering devices in said chambers, a constantly operated driving shaft, means for actuating the filtering devices in said chambers, valve mechanism for controlling the direction of current through said filtering devices, means for actuating said valve controlling mechanism and said filtering devices from the driving shaft, means constantly operated by the driving shaft for throwing said filtering devices and said valve controlling mechanism into and out of said operative relation with the driving shaft, and means for varying the speed at which the constantly operated means will be driven from the drive shaft comprising detachable gears or sprockets of a plurality of different sizes.

16. A filtering machine comprising a dust collecting compartment or hopper, means for introducing dust laden air thereinto, a cleaning chamber comprising a plurality of separated compartments associated with the first said compartment or hopper and being provided with passages communicating with the interior thereof, baffle plates adjacent the openings leading from the dust collecting compartment or hopper to the closed compartments of the cleaning chamber whereby to prevent commingling of air currents adjacent the normal passages between the said compartments, means for producing a vacuum on the interior of each of of the compartments of the filtering chamber, means for rendering the vacuum producing means of any compartment of the filtering chamber inoperative without disturbing the action of the vacuum producing means of the other compartments of the chamber, and means for opening each of the said compartments of the filtering chamber to the atmosphere when the vacuum producing means therefor is rendered inoperative, whereby a reverse current of pure air will be caused to enter the respective compartments of the filtering chamber and pass therefrom from the exterior to the interior of the filtering device and thence into the dust collecting compartment below the filtering device for the purpose of cleaning the said filtering device.

17. A filtering machine comprising a filtering chamber divided into a plurality of closed compartments, a dust collecting chamber connected with each of the said closed compartments of the filtering chamber, means for introducing dust laden air to the said dust collecting compartment, an exhaust manifold provided with passages leading to the interiors of each of the compartments of the filtering chamber, means for exhausting the air from the exhaust manifold, filtering devices in each of the said compartments of the filtering chamber, valve mechanism in each of the passages leading from the exhaust manifold to the respective compartments of the filtering chamber, said valve mechanism also being adapted to control inlets to the said passages for supplying pure air to the interiors of the respective compartments of the filtering chamber, and means for operating the said valve mechanism intermittently whereby a less number than the whole number of the compartments of the filtering chamber may have the passageway leading to the exhaust manifold closed and the passageway leading to the supply of pure air open to the interior of the compartment whereby to reverse the current passing through the exhaust compartment of the filtering chamber and the filtering device therein.

18. A filtering machine comprising a filtering chamber divided into a plurality of closed compartments, filtering devices within the compartments comprising tubular members suspended near their upper extremities, and communicating with intake openings in the bottom of the respective compartments of the filtering chamber, an exhaust header, valve controlled passageways leading from the exhaust header to the respective compartments of the filtering chamber, a dust collecting compartment associated with the respective compartments of the filtering chamber, there being passageways leading from the last said compartment to the interiors of each of the filtering devices in the respective compartments of the filtering chamber, and means for operating the valves in the said passageways between the exhaust manifold and the respective compartments of the filtering chamber comprising reciprocating valve rods, a constantly rotating shaft, clutch devices on said shaft corresponding in number to each of the said valve rods, intermediate connections between each of the said clutch devices and the said valve rods, a constantly moving endless belt, and means carried thereby for operating said clutch devices whereby to operate the said valve rods and valve mechanism carried thereby either to the open or closed position.

19. A filtering machine comprising a filtering chamber divided into a plurality of closed compartments, filtering devices within the compartments comprising cylindrical cloth tubes suspended near their upper extremities and registering with intake openings in the bottoms of the respective compartments of the filtering chamber, an exhaust header, passages leading from said exhaust header to each of the compartments of the filtering chamber, valve mechanism interposed in each of the said passages comprising a valve casing having a valve seat leading to the interior of the exhaust header and a second valve seat spaced therefrom and leading to the atmosphere, a valve rod in each of the said casings, a valve member carried by each of the said valve rods and coöperating with the said valve seats, means for operating the said valve rods comprising a driving shaft, clutch devices associated with said driving shaft, intermittently operated cams on said driving shaft and associated with said clutch devices whereby to operate the said filtering devices in the respective cleaning compartments of the filtering chamber, a constantly operated device provided with means for operating said clutch devices and cams associated therewith to the operative and inoperative positions, and connections between the movable parts of the said clutch members and the said valve rods for operating the valves carried thereby.

In testimony whereof I have signed my name to this specification on this 17th day of September, A. D. 1917.

HENRY W. TUTTLE.